United States Patent [19]

Elkins, Sr.

[11] Patent Number: 4,609,184
[45] Date of Patent: Sep. 2, 1986

[54] PIVOTED GRAVITY RETURN FENCE EXTENSION FOR CATTLE GUARD

[76] Inventor: Edwin C. Elkins, Sr., P.O. Box 208, Clearmont, Wyo. 82835

[21] Appl. No.: 541,416

[22] Filed: Oct. 13, 1983

[51] Int. Cl.$^4$ .............................................. A01K 3/00
[52] U.S. Cl. ...................................... 256/14; 256/17; 256/26; 16/312; 16/317; 49/366
[58] Field of Search .................. 256/14, 15, 16, 17, 256/18, 73, 26; 49/33, 131, 364, 366; 16/312, 317, 316; 119/27, 28

[56] References Cited

U.S. PATENT DOCUMENTS

| 1,688,238 | 10/1928 | Kamas | 49/33 |
| 2,520,642 | 8/1950 | Laurantus | 16/312 |
| 2,693,043 | 11/1954 | Leake | 49/364 |
| 2,744,728 | 5/1956 | Melchert et al. | 49/131 X |
| 2,925,674 | 2/1960 | Madden | 49/237 |
| 3,322,399 | 5/1967 | Sawyers et al. | 256/17 |
| 4,253,275 | 3/1981 | Killough | 16/312 |

Primary Examiner—Cornelius J. Husar
Assistant Examiner—Joseph A. Fischetti
Attorney, Agent, or Firm—Harvey B. Jacobson

[57] ABSTRACT

A fence line is provided including a pair of spaced posts between which a fence opening is defined and wherein a cattle guard is substantially centered in the opening and spans considerably less than the width of the opening. A pair of edge upstanding panel-like wing closure members are provided at opposite sides of the opening between the posts and the adjacent sides of the cattle guard and pivot structure pivotally mounts first corresponding upstanding base edge portions of the closure members at the opposite sides of the opening for angular displacement about upstanding axes and with the closure members including second free swinging upstanding edge portions opposite the first edge portions swingable toward and away from closed positions with the second edge portions at least closely adjacent the opposite sides of the cattle guard and an upstanding plane containing the fence line opening. The pivot structure is operative to yieldingly bias the wing closure members from open positions thereof toward the closed positions thereof and is also operative to yieldingly resist movement of the wing closure members from the closed positions toward the open positions with a greater resistance to movement of the closure members from the closed positions toward the open positions than the biasing force on the closure members to swing the latter from the open positions toward the closed positions.

7 Claims, 6 Drawing Figures

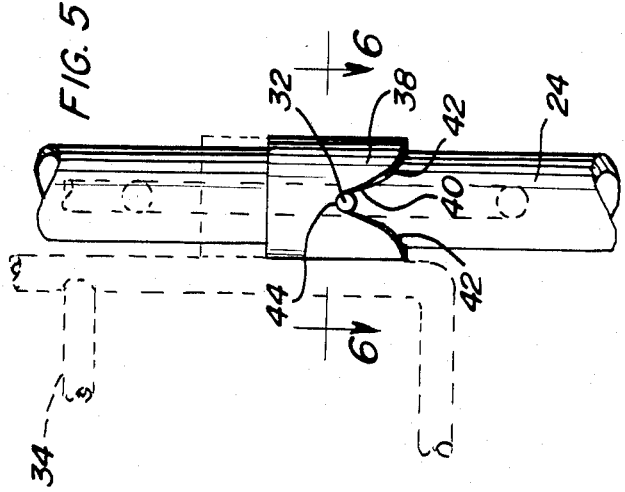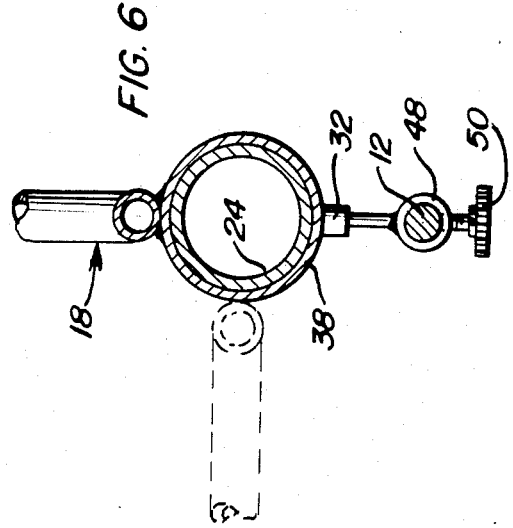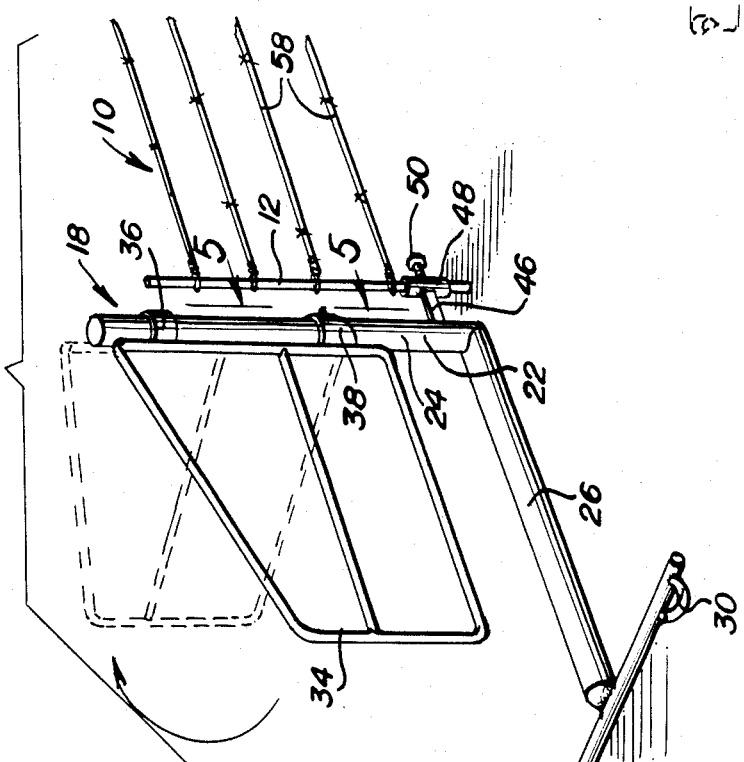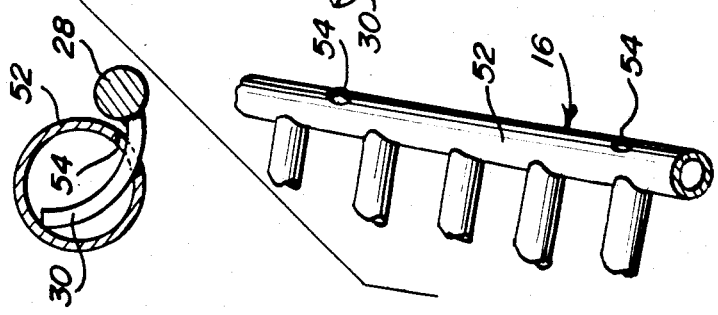

PIVOTED GRAVITY RETURN FENCE EXTENSION FOR CATTLE GUARD

BACKGROUND OF THE INVENTION

Fence line openings in areas where cattle are raised are conventionally provided with ground level cattle guards which cattle are very reluctant to cross. This allows a gate opening to be maintained for the passage of vehicles therethrough without worry of cattle also passing through the gate opening. However, most cattle guards are quite limited in width and may be of sufficient width only to enable conventional vehicles such as automobiles, small trucks and narrow farm equipment to move thereover through an associated gate opening, but are not of sufficient width to allow heavy wide trucks and wide farm implements to pass through the adjacent fence opening. Further, although it would be possible to manufacture cattle guards of increased width to enable wide trucks and farm equipment to move through a cattle guard equipped opening, the provision of an overly wide cattle guard raises the possibility that more than a few cattle adjacent a wide cattle guard would move toward a wide fence opening if they were "spooked" with the result that at least several cattle on the approach side of such a cattle guard would be forced therethrough and perhaps receive severe foot or leg injuries.

Accordingly, a need exists for a cattle guard equipped fence opening which will allow wide loads to pass therethrough but which will have the appearance of a narrow cattle guard equipped fence opening at all times when a wide load is not passing therethrough.

In addition, various different forms of automatic closing gravity biased gates heretofore have been provided and such gravity biased gates could be utilized to fully close a wide cattle guard equipped fence opening. However, providing full width gravity biased closure gates for a wide cattle guard equipped fence opening would require that the gates be opened and closed each time a small vehicle is to pass through the gate opening and each such small vehicle to pass through the gate opening would have to at least substantially stop prior to engagement with the gravity biased gate or gates and then proceed slowly forwardly in order to open the gates. In addition, conventional small vehicles such as passenger cars and the pckup trucks do not always include front end portions which properly mate with gravity biased gates in order to open the same.

Accordingly, a need exists for a cattle guard equipped fence opening including the usual narrow cattle guard centered in a considerably wider fence opening and wherein the adjacent fence section ends are equipped with pivotally mounted wing gates or closure members gravity biased to the closed positions substantially closing the span between each side of the associated fence opening and the adjacent side of the cattle guard.

Examples of various different forms of gravity closed gate structures including some of the general structural and operational features of the instant invention are disclosed in U.S. Pat. Nos. 272,619, 2,693,043, 2,925,674 and 3,222,806.

BRIEF DESCRIPTION OF THE INVENTION

The cattle guard and pivoted gravity return fence extension of the instant invention incorporate a pair of gate-type fence extensions for mounting between opposite sides of a narrow cattle guard and spaced opposite sides of a wide fence opening in which the cattle guard is substantially centered. Narrow vehicles and the like may pass over the cattle guard and through the fence opening inward of the closed pivoted fence extensions in the usual manner and when wide vehicles such as heavy trucks or wide farm equipment must be moved through the fence opening, the wide vehicles may approach either side of the fence extensions and engage the latter so that they may be pivoted toward open positions and then passed through the wide gate opening. After a wide vehicles has moved through the gate opening widened by movement of the fence extensions toward their open positions, the fence extensions may close by gravity behind the wide vehicle. In this manner, the usual narrow cattle guard equipped fence opening may be maintained for the passage of narrow vehicles through the fence opening and the prevention of movement of cattle through the fence opening while still enabling wide loads to pass through the fence opening.

The main object of this invention is to provide a cattle guard equipped gate opening wherein a conventional narrow cattle guard is maintained and yet wherein the fence opening may be readily enlarged to allow wide vehicles and farm implements to pass therethrough.

Another object of this invention is to provide a cattle guard equipped gate opening of a width considerably greater than the width of the associated cattle guard and including wing gate sections swingable to closed positions narrowing the gate opening to substantially the width of the cattle guard, but which may be swung toward open positions to considerablly increase the width of the gate opening.

Another important object of this invention is to provide pivoted gate extensions for use with a widened cattle guard equipped gate opening wherein the extensions are mounted for gravity closing.

Yet another important object of this invention is to provide pivoted gate extensions for an enlarge cattle guard equipped gate opening wherein the extensions may be stationarily mounted relative to an existing cattle guard and relocated fence posts.

A final object of this invention to be specifically enumerated herein is to provide an assembly in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an exploded respective view of one side portion of the cattle guard and the adjacent fence and fence extension components of the instant invention;

FIG. 4 is an enlarged fragmentary transverse vertical sectional view taken substantially upon the plane indicated by the section line 4—4 of FIG. 1;

FIG. 5 is a fragmentary enlarged elevational view of the pivot structure by which one of the fence extensions is pivotally mounted for gravity returning to a closed position; and FIG. 6 is a horizontal sectional view taken substantially upon the plane indicated by the section line 6—6 of FIG. 5.

DETAILED DESCRIPTION OF THE INVENTION

Figures 1, 2:
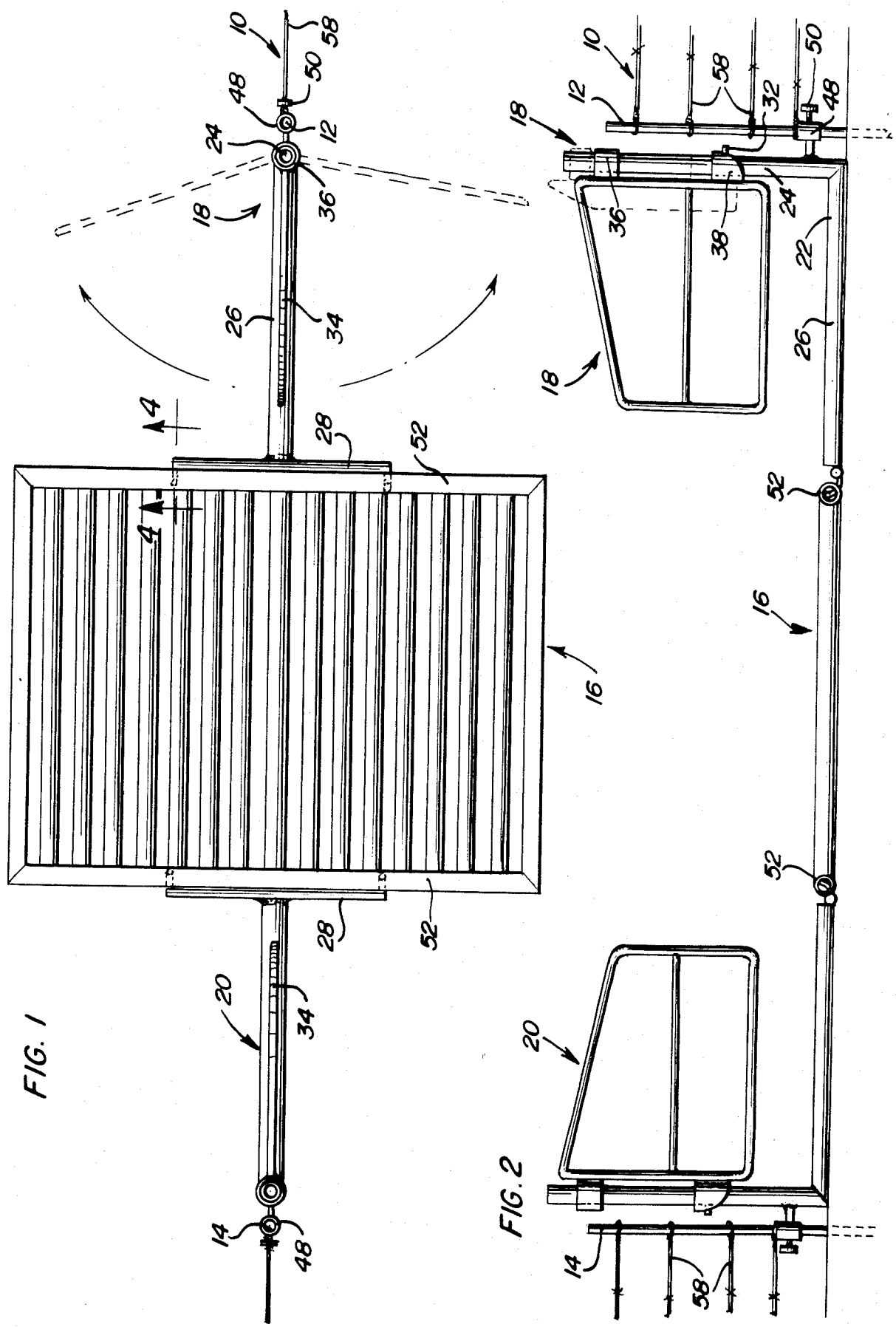
FIG. 1 is a top plan view of a cattle guard equipped fence opening incorporating the pivoted wing fence extensions of the instant invention.
FIG. 2 is an elevational view of the assemblage illustrated in FIG. 1.

Referring now more specifically to the drawings, the numeral 10 generally designates a fence construction including a pair of horizontally spaced apart fence end posts 12 and 14 between which a wide fence opening is defined. A narrow tubular cattle guard referred to in general by the reference numeral 16 and of substantially conventional design is centrally disposed in the fence opening at ground level. The cattle guard 16 may comprise any suitable form of cattle guard.

It will be noted from FIGS. 1 and 2 of the drawings that the width of the cattle guard 16 is considerably less than the width of the opening defined between posts 12 and 14. The spacing defined between opposite sides of the cattle guard 16 and the adjacent posts 12 and 14 are occupied by fence extension assemblies referred to in general by the reference numerals 18 and 20 and which are substantially identical in construction. Accordingly, only the details of construction of the fence extension assembly 18 will be discussed.

Referring now more specifically to FIGS. 2 and 3 of the drawings, it may be seen that the fence extension assembly 18 comprises an L-shaped support 22 including the vertical leg 24 and horizontal leg 26 projecting outwardly from the lower end of the vertial leg 24. The free end of the horizontal leg 26 remote from the vertical leg 24 includes a transverse bar 28 mounted therefrom and the opposite ends of the bar 28 include laterally outwardly projecting and arcuate anchor members 30 supported therefrom. The vertical leg 24 includes a horizontally outwardly projecting cam pin 32 spaced intermediate the upper and lower ends of the leg 24 and projecting outwardly from the side thereof opposite the horizontal leg 26. A wing fence extension 34 is provided and includes a pair of upper and lower mounting sleeves 36 and 38 rotatably received on the vertical leg 24 whereby the extension 34 is swingably supported form the vertical leg 24 in the manner of a horizontally swingable gate.

With attention invited more specifically to FIG. 5 of the drawings, it may be seen that the mounting sleeve 38 includes a downwardly opening notch 40 in its lower end with upwardly curving and convergent sides 42 with which the pin 32 is engageable. When the pin 32 is seated in the upper end 44 of the notch 40, the extension 34 is in the position thereof illustrated in FIG. 3 of the drawings forming an extension of the adjacent end of the fence 10. However, the free swinging edge of the extension 34 is deflectable laterally of the plane of the fence 10 toward an open position and during movement of the extension 34 toward an open position, the pin 32 will ride downwardly along the corresponding side 42 of the notch 44 and the extension 34 will be elevated. When the force on the extension 34 to swing the latter toward the open phantom line position thereof illustrated in FIG. 3 is terminated, the weight of the extension 34 and the coacting between the corresponding side 42 and the cam pin 32 will cause the extension 34 to swing, by gravity, back to the closed position thereof illustrated in FIG. 3 of the drawings.

It will also be noted from FIGS. 1, 2, 3 and 6 of the drawings, that the side of the lower end of the vertical leg 24 remote from the horizontal leg 26 includes an outwardly projecting brace 46 from whose outer end a vertical sleeve 48 equipped with a threaded set screw 50 is supported.

When it is desired to install the assemblies 18 and 20 relative to the associated fence 10 and cattle guard 16, the side tubular members 52 of the cattle guard 16 are each provided with a pair of longitudinally spaced bores 54, see FIGS. 3 and 4, and the vertical leg portions of the assemblies 18 and 20 are elevated while the latter are moved into position to enable the arcuate anchor members 30 to be inserted through the respective bore 54. Then, the vertical leg portions of the assemblies 18 and 20 are lowered into the approximate positions thereof illustrated in FIG. 2 of the drawings. Thereafter, the posts 12 and 14 are inserted downwardly through the sleeves 48 and driven into the ground, after which the fence strands 58 may be attached to the posts 12 and 14 in the usual manner. If the ground slopes from the cattle guard 16 downward toward one of the posts 12 or 14, the corresponding sleeve 48 is elevated along that post until the corresponding horizontal leg 26 is substantially horizontal. Then, the corresponding set screw 50 may be tightened in order to retain that fence extension assembly in the adjusted position. If, on the other hand, the ground slopes downward from one of the posts 12 and 14 toward the cattle guard 16, it is unnecessary to make adjustments in heighth to the vertical leg 24 of the corresponding fence extension assembly.

After the fence extension assemblies 18 and 20 have been erected in the manner illustrated in the drawings and described above, narrow vehicles such as conventional passenger vehicles, light trucks and farm tractors may readily pass through the narrowed fence opening defined between the free swinging edges of the extensions 34 while moving over the narrow cattle guard 16. However, if a wide vehicle such as a heavy truck or piece of wide farm equipment is to pass through the fence opening, that vehicle is moved toward and engaged with the free swinging edges of the extensions 34 in order to force the latter toward their open positions to thereby enable the wide load also to pass through the gate opening. Movement of the extensions 34 toward the open positions thereof greatly increases the width of the fence opening defined between the fence assemblies 18 and 20. However, as soon as a wide load passing through the widened fence opening, the extensions 34 will automatically swing, by gravity, back to the closed positions thereof illustrated in FIGS. 1, 2 and 3 of the drawings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a fence line including a pair of spaced posts between which a wide fence opening is defined and wherein a narrow cattle guard of the type to allow unrestricted passage of automobile width vehicle thereover is substantially centered in said opening and spans considerably less than the width of said opening such that opposite sides of said guard are spaced along said opening from said posts, a pair of edge upstanding pannel-like wing closure members, pivot means pivotally mounting first corresponding upstanding base edge portions of said closure members for angular displacement, independent of interference with said cattle guard, about upstanding axes and with said closure members including second free swinging edge portions opposite said first edge portions swingable toward and away from closed positions with said second edge portions at least closely adjacent the opposite sides of the cattle guard and an upstanding plane containing said fence line opening, said pivot means including biasing means operative to yieldingly bias said wing closure members toward said closed position.

2. The wing closure members of claim 1 wherein said pivot means also includes resistance means operative to yieldingly resist movement of said wing closure members from said closed positions toward said open positions.

3. The wing closure members of claim 2 wherein said resistance means is operative to resist initial movement of said closure members from said closed positions toward said open positions with a greater force than said biasing means biases said closure members toward said closed positions from substantially full open positions thereof.

4. The wing closure members of claim 1 wherein said pivot means includes a pair of horizontally spaced apart upstanding post defining members disposed closely adjacent said posts at the corresponding sides of said gate opening and including lower end horizontally projecting mounting members projecting toward the adjacent sides of said cattle guard, the adjacent ends of said horizontal members including anchor means anchored to adjacent side portions of said cattle guard, said wing closure members being pivotally mounted from said post defining members.

5. The wing closure members of claim 4 wherein said anchor means comprise transverse bars carried by the adjacent ends of said horizontal members and opposite end portions of said transverse bars including lengthwise outwardly projecting elongated anchor members received through openings provided for the in the adjacent side portions of said cattle guard.

6. In combination with a fence line including a pair of spaced posts between which a wide fence opening is defined and wherein a narrow cattle guard of the type to allow unrestricted passage of automobile width vehicle thereover is substantially centered in said opening and spans considerably less than the width of said opening such that opposite sides of said guard are spaced along said opening from said posts, a pair of edge upstanding panel-like wing closure members, pivot means pivotally mounting first corresponding upstanding base edge portions of said closure member for angular displacement, independent of interference with said cattle guard, about upstanding axes and with said closure members including second free swinging edge portions opposite said first edge portions swingable toward and away from closed positions with said second edge portions at least closely adjacent the opposite sides of the cattle guard and an upstanding plane containing said fence line opening, said pivot means including biasing means operative to yieldingly bias said wing closure members toward said closed position, said pivot means including upright support members stationarily positioned adjacent the portions of said fence defining the side extremities of said opening, a pair of generally aligned upper and lower sleeve carried by each of said wing closure members rotatably mounted on the corresponding upright support members, said biasing means including a horizontally outwardly projecting cam pin carried by each of said upright support members and downwardly opening notch formed in one sleeve carried by each of said wing closure members and in which the corresponding cam pin is receivable, the sides of said notches being upwardly convergent.

7. The wing closure members of claim 6 wherein said resistance means includes at least upwardly curving upper end portions of the sides of said notches.

* * * * *